(12) United States Patent
Cho

(10) Patent No.: US 9,944,146 B2
(45) Date of Patent: Apr. 17, 2018

(54) APPARATUS AND METHOD FOR CONTROLLING VARIABLE AXLE FOR PREVENTING SAFETY ACCIDENT

(71) Applicants: Hyundai Motor Company, Seoul (KR); Kia Motors Corporation, Seoul (KR)

(72) Inventor: Han Su Cho, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 15 days.

(21) Appl. No.: 15/358,474

(22) Filed: Nov. 22, 2016

(65) Prior Publication Data

US 2017/0349021 A1 Dec. 7, 2017

(30) Foreign Application Priority Data

Jun. 2, 2016 (KR) .......................... 10-2016-0069019

(51) Int. Cl.
*B60G 17/017* (2006.01)
(52) U.S. Cl.
CPC ........ *B60G 17/017* (2013.01); *B60G 2400/30* (2013.01); *B60G 2400/96* (2013.01); *B60G 2800/20* (2013.01)
(58) Field of Classification Search
CPC .............. B60G 17/017; B60G 2400/30; B60G 2400/96; B60G 2800/20
See application file for complete search history.

(56) References Cited

U.S. PATENT DOCUMENTS

| 7,222,867 B2 | 5/2007 | Rotz et al. |
| 2003/0151222 A1* | 8/2003 | Sutton .................. B62D 61/125 280/86.5 |
| 2009/0206570 A1* | 8/2009 | Strong .................. B62D 61/12 280/86.5 |

FOREIGN PATENT DOCUMENTS

| KR | 0141399 B1 | 3/1997 |
| KR | 20-0168513 Y1 | 11/1999 |
| KR | 10-0607209 B1 | 7/2006 |
| KR | 10-1096808 B1 | 12/2011 |
| KR | 10-1519411 B1 | 5/2015 |
| KR | 10-2016-0056714 A | 5/2016 |

* cited by examiner

*Primary Examiner* — Aaron L Troost
(74) *Attorney, Agent, or Firm* — Morgan, Lewis & Bockius LLP

(57) ABSTRACT

There are provided an apparatus and a method for controlling a variable axle for preventing a safety accident. An apparatus for controlling a variable axle that controls operation power to one switch which is short-circuited or opened according to a manipulation of a user, and supplies the operation power for a descent of a pusher axle, includes: the other switch having one end connected to power of a vehicle and the other end which is short-circuited or opened in response to a control signal, to thereby supply the power of the vehicle as the operation power at the time of the short-circuit; and a controller confirming whether or not the vehicle is remotely being started when an ignition of the vehicle is turned-on, and opening the other switch by the control signal in the case in which the vehicle is remotely being started as a result of the confirmation.

12 Claims, 3 Drawing Sheets

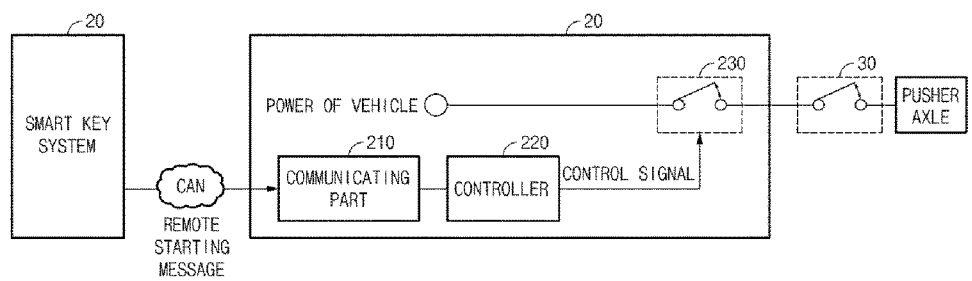

FIG. 2

| SW2 (L_SW) | STATE OF POWER OF VEHICLE | PUSHER AXLE ACCORDING TO THE RELATED ART | SW1 | PUSHER AXLE ACCORDING TO THE PRESENT DISCLOSURE | |
|---|---|---|---|---|---|
| OFF | IGN ON | ASCENT | ON | ASCENT | ~310 |
| | IGN ON -> IGN OFF | MAINTAIN ASCENT | ON | MAINTAIN ASCENT | ~320 |
| | REQUEST REMOTE STARTING | MAINTAIN ASCENT | OFF | MAINTAIN ASCENT | ~330 |
| ON | IGN ON | DESCENT | ON | DESCENT | ~340 |
| | IGN ON -> IGN OFF | MOVE IN ASCENT DIRECTION | ON | MOVE IN ASCENT DIRECTION | ~350 |
| | REQUEST REMOTE STARTING | MOVDE IN DESCENT DIRECTION | OFF | MAINTAIN ASCENT | ~360 |

FIG. 3

APPARATUS AND METHOD FOR CONTROLLING VARIABLE AXLE FOR PREVENTING SAFETY ACCIDENT

CROSS-REFERENCE TO RELATED APPLICATION

The present application is based on and claims the benefit of priority to Korean Patent Application No. 10-2016-0069019, filed on Jun. 2, 2016 in the Korean Intellectual Property Office, the entire contents of which is incorporated herein for all purposes by this reference.

FIELD OF THE INVENTION

The present invention relates to a technology of controlling a variable axle, and more particularly, to an apparatus and a method for controlling a variable axle for preventing a safety accident at the time of starting on a vehicle.

BACKGROUND OF THE INVENTION

In general, a heavy vehicle such as a truck on which a cargo having large loading is loaded includes a pusher axle so as to secure suitable axle weight depending on whether or not the cargo is loaded.

Such a pusher axle is used to allow the loading distributed to each shaft in a heavy truck not to exceed a predetermined magnitude and a defined loading to be acted.

Typically, in a situation in which a loading applied to a drive shaft by weight of the cargo exceeds a suitable level, the vehicle performs a descent of the pusher axle to distribute the loading applied to the drive shaft to the pusher axle. In contrast, in a state in which a loading capable of being sufficiently supported by only the drive shaft acts, the vehicle performs an ascent of the pusher axle and drives.

However, a 10×4 cargo vehicle among the heavy vehicles is configured to adjust the descent or the ascent of the pusher axle (a tri-axes axle) depending on ON/OFF of an ascent/descent switch which is out of the vehicle, in an ignition on state. However, the pusher axle is configured to automatically ascend regardless of the state of the switch in an ignition off state.

As such, since the pusher axle according to the related art automatically descends in the ignition on state (when the ascent/descent switch is turned on), there is danger that people around the vehicle are caught by a wheel and are injured in a case in which a driver does not exist around the vehicle in a remote starting situation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and a method for controlling a variable axle for preventing a safety accident configured for preventing the safety accident caused by a descent of the pusher axle at a time of remotely starting a vehicle.

Objects of the present invention are not limited to the objects described above, and other objects that are not described above may be clearly understood by those skilled in the art from the following description.

According to an exemplary embodiment of the present invention, an apparatus for controlling a variable axle that controls operation power to a first switch which is short-circuited or opened according to a manipulation of a user, and supplies the operation power for a descent of a pusher axle, includes: a second switch having a first end connected to power of the vehicle and a second end which is short-circuited or opened in response to a control signal, to supply the power of the vehicle as the operation power at a time of the short-circuit; and a controller confirming whether or not the vehicle is remotely being started when an ignition of the vehicle is turned-on, and opening the second switch by the control signal in the case in which the vehicle is remotely being started as a result of the confirmation.

According to another exemplary embodiment of the present invention, a method for controlling a variable axle by at least one processor controlling the second switch having a first end connected to power of a vehicle and a second end connected to the first end of one switch which manually manipulates an ascent and a descent of a pusher axle, includes: when an ignition of the vehicle is turned-on, confirming whether or not the vehicle is remotely being started; and when the vehicle is remotely being started as a result of the confirmation, controlling a second switch to be opened.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a configuration diagram of an apparatus for controlling a variable axle according to an exemplary embodiment of the present invention.

FIG. 3 is a table illustrating operation states of the variable axle invention.

Figure 1A:
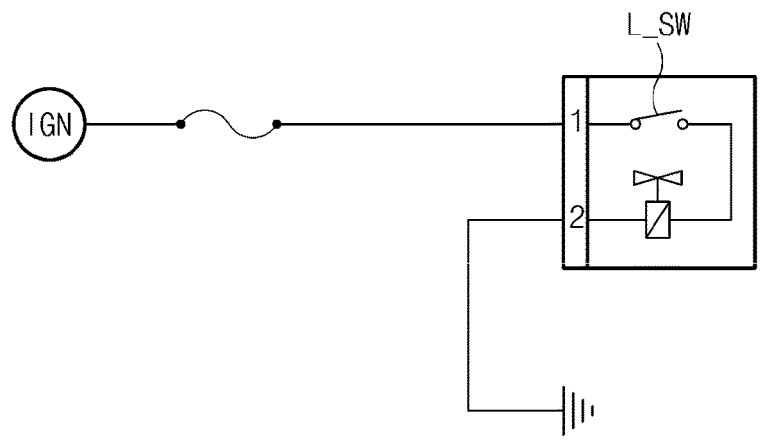
FIG. 1A illustrates a pusher axle according to the related art and a peripheral circuit diagram thereof.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1B:
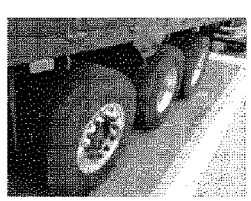
FIG. 1B is a view illustrating pusher axle states according to a manual manipulation of an ascent/descent switch according to the related art.

Hereinafter, before describing a detailed configuration of the present invention, a pusher axle according to the related art will be described with reference to FIG. 1A and FIG. 1B. FIG. 1A illustrates a pusher axle according to the related art and a peripheral circuit diagram thereof and FIG. 1B is a view illustrating pusher axle states according to a manual manipulation of an ascent/descent switch according to the related art.

As illustrated in FIG. 1A, the pusher axle according to the related art is supplied with power of a vehicle to ascend, or is not supplied with the power of the vehicle to descend, depending on a manipulation state of an ascent/descent switch L_SW at a time of an ignition on. Specifically, the pusher axle according to the related art descends at a time of the ignition on and a turn-on of the ascent/descent switch L_SW (see a lower row of FIG. 1B), and ascends at a time of the ignition on and a turn-off of the ascent/descent switch L_SW (see an upper row of FIG. 1B).

In addition, the pusher axle according to the related art has characteristics that it ascends regardless of the turn-on/off of the ascent/descent switch L_SW at the time of the ignition off.

Accordingly, since the pusher axle according to the related art automatically descends regardless of whether or not a remote starting is performed at the time of the ignition on, there was danger of a safety accident of a driver at the time of the remote starting.

Hereinafter, exemplary embodiments of the present invention will be described in detail with reference to the accompanying drawings. FIG. 2 is a configuration diagram illustrating an apparatus for controlling a variable axle according to an exemplary embodiment of the present invention.

As illustrated in FIG. 2, the apparatus 20 for controlling a variable axle according to an exemplary embodiment of the present invention includes a communicating part 210, an automatic switch 230, and a controller 220. For example, the communicating part 210, the automatic switch 230, and the controller 220 may be components of a smart junction box.

Such the apparatus 20 for controlling a variable axle according to an exemplary embodiment of the present invention supplies or blocks driving power for a descent of the pusher axle to or from a manual switch 30 which is opened or short-circuited according to a manual manipulation of the driver. Here, the manual switch 30 may be the ascent/descent switch L_SW included in a pusher axle OP panel according to the related art (P_Axle_OP_PNL of FIG. 1A). Hereinafter, the respective components of the apparatus 20 for controlling a variable axle according to an exemplary embodiment of the present invention will be described.

The communicating part 210 supports one vehicle network communication of a controller area network (CAN), a media oriented system transport (MOST) network, and a local interconnection network (LIN). Since a smart key system typically performs CAN communication, a case in which the communicating part 210 performs the CAN communication will be described below by way of example.

The automatic switch 230 has a first end connected to the power of the vehicle and a second end connected to a first end of the manual switch 30, to be short-circuited or opened in response to a control signal of the controller 220. For example, the automatic switch 230 may be a relay element including hybrid synergy drive (HSD) or an intelligent power supply (IPS) which is typically included in the smart junction box.

When an ignition of the vehicle is turned on, the controller 220 confirms whether or not the vehicle is remotely being started. As a result of the confirmation, when the vehicle is in a state in which it is remotely being started, the controller 220 outputs a control signal that opens the automatic switch 230.

In this case, if the controller 220 receives a CAN message informing that the vehicle is remotely being started, from the smart key system 10 through the communicating part 210, the controller 220 may confirm that the vehicle is remotely being started.

Specifically, the controller 220 may transmit a message querying whether or not the vehicle is remotely being started to the smart key system 10, and may receive a CAN message informing that the vehicle is remotely being started as a response to the query from the smart key system 10. In this case, if it is confirmed that the vehicle is remotely being started, the smart key system 10 may also autonomously transmit a CAN message informing the remote starting without receiving a request from the controller 220.

The controller 220 controls the automatic switch 230 to be opened by the remote starting and then confirms whether or not the vehicle is converted into a general starting. In this case, the controller 220 may confirm whether or not the vehicle is converted from the remote starting to the general starting by confirming at least one of an open and close of a door of a driver seat, a sensing of weight of the driver seat, a manipulation of an accelerator, and an existence of a smart key within the vehicle.

As an example, if the controller 220 confirms that the driver gets into the vehicle by the open and close of the door of the driver seat and a lower sensor of the driver seat after the remote starting, the controller 220 may confirm that the vehicle is converted into the general starting.

As another example, when the controller 220 confirms the existence of the smart key within the vehicle and the manipulation of the accelerator after the remote starting, the controller 220 may confirm that the vehicle is converted into the general starting.

As another example, if a condition in which the door of the driver seat is opened or closed, a condition in which a passenger exists on the driver seat, a condition in which the accelerator is turned-on, and a condition in which the smart key exists within the vehicle are all satisfied after the remote starting, the controller 220 may confirm that the vehicle is converted into the general starting. In this case, the controller 220 may confirm that the smart key exists within the vehicle by receiving a message informing that the vehicle is converted into the general starting from the smart key system.

If the controller 220 confirms that the vehicle is converted into the general starting, the controller 220 outputs a control signal to control the automatic switch 230 to be short-circuited. As such, the controller 220 outputs the control signal that short-circuits the automatic switch 20 except for the case in which the vehicle is remotely being started.

Accordingly, according to an exemplary embodiment of the present invention, the power of the vehicle applied to the manual switch 30 is supplied or blocked by the control of the controller 220 within the smart junction box, making it possible to prevent the safety accident which may be caused in people around the vehicle due to the descent of the pusher axles at the time of the remote starting.

Hereinafter, operation states of a variable axle according to an exemplary embodiment of the present invention will be described with reference to FIG. 3. FIG. 3 is a table illustrating the operation states of the variable axle according to an exemplary embodiment of the present invention.

Referring to FIG. 3, the controller 220 controls the automatic switch 230 to be in an on state except for a case in which the remote starting is requested.

Hereinafter, the operation states of the pusher axle will be described by classifying a case in which the manual switch 30 is turned-off and a case in which the manual switch 30 is turned-on.

Case in which Manual Switch 30 is Turned-Off

In the case in which the manual switch 30 is turned-off, when the ignition of the vehicle is turned-on, the pusher axles according to the related art and the present invention ascend (310) because the power of the vehicle is not supplied to the pusher axles.

In addition, in the case in which the manual switch 30 is turned-off, when the vehicle is converted from an ignition turned-on state to an ignition turned-off state, the pusher axles according to the related art and the present invention ascend and are maintained (320) because the power of the vehicle is not still supplied to the pusher axles.

Alternatively, in the case in which the manual switch 30 is turned-off, when the remote starting is requested, both of the automatic and manual switches 230 and 30 are in the turned-off state. Therefore, the pusher axles according to the related art and the present invention ascend and are maintained (330) because the power of the vehicle is not still supplied to the pusher axles.

Case in which Manual Switch 30 is Turned-on

In the case in which the manual switch 30 is turned-on, when the ignition of the vehicle is turned-on, the pusher axle descends 340 because the power of the vehicle is supplied to the pusher axle via the automatic and manual switches 230 and 30, which are each in the turned-on state.

In the case in which the manual switch 30 is turned-on, when the vehicle is converted from an ignition turned-on state to an ignition turned-off state, the power of the vehicle is supplied to the pusher axle via the automatic and manual switches 230 and 30, but the pusher axle moves in an ascent direction by a second side circuit of the pusher axle (350).

In the case in which the manual switch 30 is turned-on, when the remote starting is requested, the pusher axle according to the related art is supplied with the power of the vehicle by the manual switch 30 to be moved in the ascent direction (350).

However, the pusher axle according to an exemplary embodiment of the present invention is not supplied with the power of the vehicle by the turn-off of the automatic switch 230 to maintain an ascent state (360).

Accordingly, according to an exemplary embodiment of the present invention, the safety accident caused by the descent of the pusher axle at the time of the remote starting may be prevented by blocking the power of the vehicle supplied to the pusher axle at the time of the remote starting.

Figure 4:
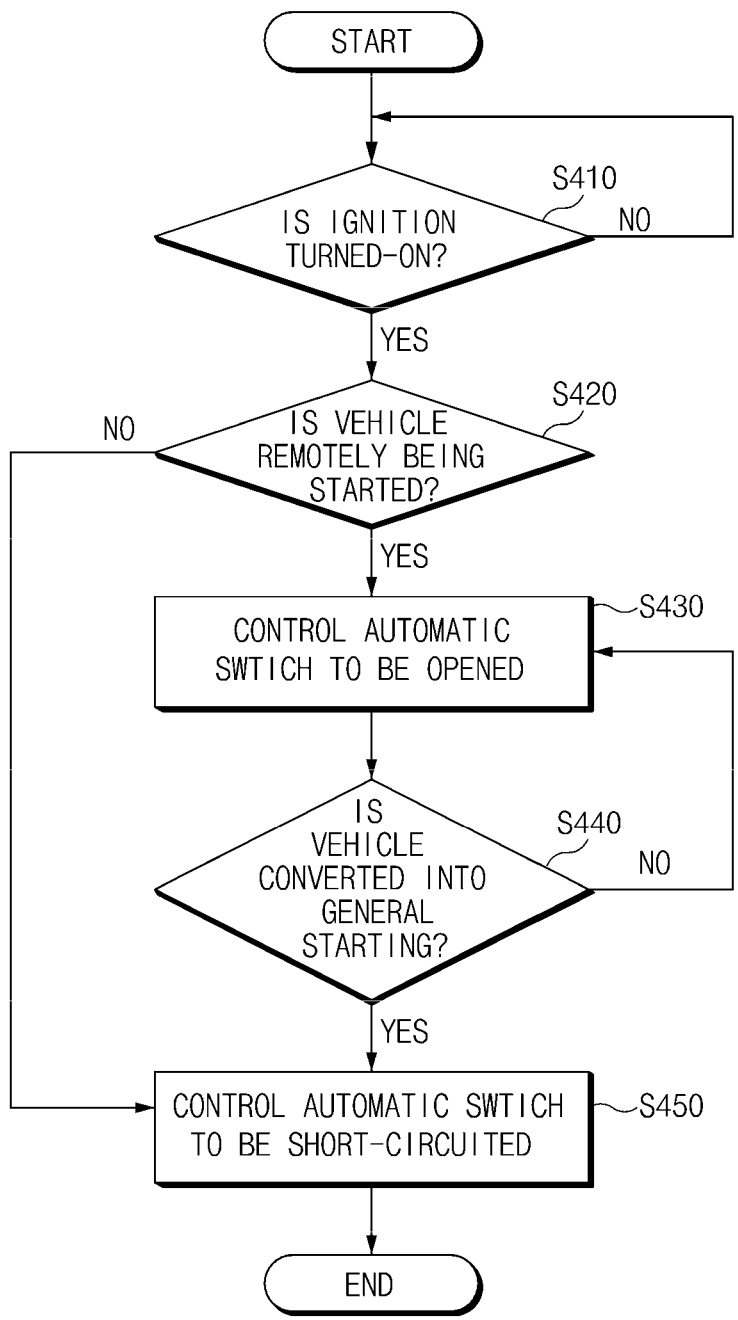
FIG. 4 is a flow chart illustrating a method for controlling a variable pusher axle according to an exemplary embodiment of the present invention.

Hereinafter, a method for controlling a variable pusher axle according to an exemplary embodiment of the present invention will be described with reference to FIG. 4. FIG. 4 is a flow chart illustrating a method for controlling a variable pusher axle according to an exemplary embodiment of the present invention.

Referring to FIG. 4, when the ignition of the vehicle is turned-on (Yes in S410), the controller 220 confirms whether or not the vehicle is remotely being started (S420).

As a result of the confirmation, when the vehicle is remotely being started, the controller 220 outputs a control signal that opens the automatic switch 230. Specifically, in the case in which the ignition of the vehicle is turned-off, since the pusher axle is in the ascent state, and the pusher axle is not supplied with the power of the vehicle regardless of a state of the manual switch 30 by the open of the automatic switch 230, the pusher axle is maintained in a prior ascent state.

Thereafter, the controller 220 confirms whether or not the vehicle is converted from the remote starting to the general starting (S440).

As another example, when the controller 220 confirms that the driver gets into the vehicle by weight of the driver seat, the controller 220 may confirm that the vehicle is converted into the general starting.

As another example, when the controller 220 confirms the manipulation of the accelerator, the controller 220 may confirm that the vehicle is converted into the general starting.

Alternatively, the controller 220 may confirm that the vehicle is converted into the general starting through a message from the smart key system.

When the controller 220 confirms that the vehicle is converted into the general starting, the controller 220 outputs a control signal that short-circuits the automatic switch 230.

As a result, the pusher axle is supplied with the power of the vehicle via the automatic and manual switches 230 and 30 to thereby ascend, or is not supplied with the power of the vehicle by the open of the manual switch 30 to thereby descend, depending on a control state of the manual switch 30.

Meanwhile, in S420, in the state in which the ignition of the vehicle is turned-on, when the controller 220 confirms a general starting state, the controller 220 maintains the automatic switch 230 in a short-circuited state to allow the pusher axle to ascend or descend depending on the state of the manual switch 30.

Accordingly, according to an exemplary embodiment of the present invention, the safety accident caused by the descent of the pusher axle at the time of the remote starting may be prevented by blocking the power of the vehicle supplied to the pusher axle at the time of the remote starting.

As described above, according to the exemplary embodiments of the present invention, the safety accident caused by the descent of the pusher axle at the time of remotely starting the vehicle may be prevented.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling a variable axle, the apparatus comprising:
a first switch controlling raising and lowering a pusher axle according to a manipulation of a user;

a second switch controlling a power supply for raising and lowering the pusher axle;
a controller controlling the second switch such that the power supply is cut off when a vehicle is remotely turned on.

2. The apparatus according to claim 1, further comprising a communicating part supporting vehicle network communication,
wherein when the controller receives a first message informing that the vehicle is remotely being started from a smart ignition system through the communicating part, the controller determines that the vehicle is remotely being started.

3. The apparatus according to claim 2, wherein when an ignition of the vehicle is turned-on, the controller queries the smart key system through the vehicle network communication whether or not the vehicle is remotely being started, and receives the first message, which is a response to a query, from the smart key system.

4. The apparatus according to claim 2, wherein the second switch, the controller, and the communicating part are included in a smart junction box.

5. The apparatus according to claim 1, wherein the controller controls the second switch such that the supply power is supplied when the vehicle is not remotely started.

6. The apparatus according to claim 1, wherein when the controller confirms that the vehicle is remotely started and is then converted into a general starting, the controller cuts off the second switch such that the supply power is supplied.

7. The apparatus according to claim 6, wherein when at least one of a condition in which a door of a driver seat is opened or closed, a passenger exists on the driver seat, an accelerator is turned-on, and a smart key exists within the vehicle is satisfied after a remote starting, the controller determines that the vehicle is converted into the general starting.

8. A method for controlling a variable axle comprising:
controlling, by a first switch, raising and lowering a pusher axle according to a manipulation of a user
controlling, by a second switch, a power supply for raising and lowering the pusher axle;
controlling, by a controller, the second switch such that the power supply is cut off when a vehicle is remotely turned on.

9. The method according to claim 8, further comprising, controlling the second switch to be cut off when the vehicle is not remotely started.

10. The method according to claim 8, wherein confirming of whether or not the vehicle is remotely being started includes confirming that the vehicle is remotely being started when a first message informing a remote starting is received from a smart key system through a vehicle network.

11. The method according to claim 10, wherein the confirming of whether or not the vehicle is remotely being started further includes transmitting a second message querying whether or not the vehicle is remotely being started to the smart ignition system through the vehicle network, when the vehicle is turned-on, and
the second message is a response to the first message of the smart ignition system.

12. The method according to claim 8, further comprising:
confirming whether or not at least one of a condition in which a door of a driver seat is opened or closed, a passenger exists on the driver seat, an accelerator is turned-on, and a smart key exists within the vehicle is satisfied after the remote starting; and
when the at least one of the conditions is satisfied, controlling the second switch to be cut off.

* * * * *